F. B. THOMPSON.
PHOTOGRAPHIC FILM TREATING APPARATUS.
APPLICATION FILED SEPT. 15, 1915. RENEWED APR. 8, 1918.
1,281,711.
Patented Oct. 15, 1918.
8 SHEETS—SHEET 3.
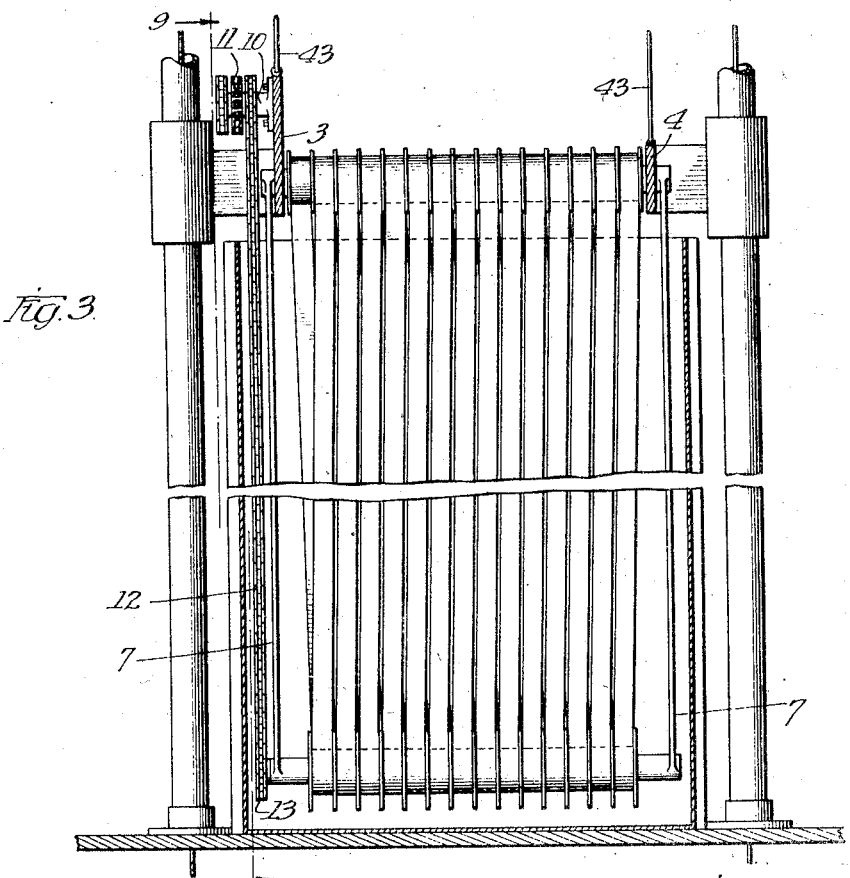
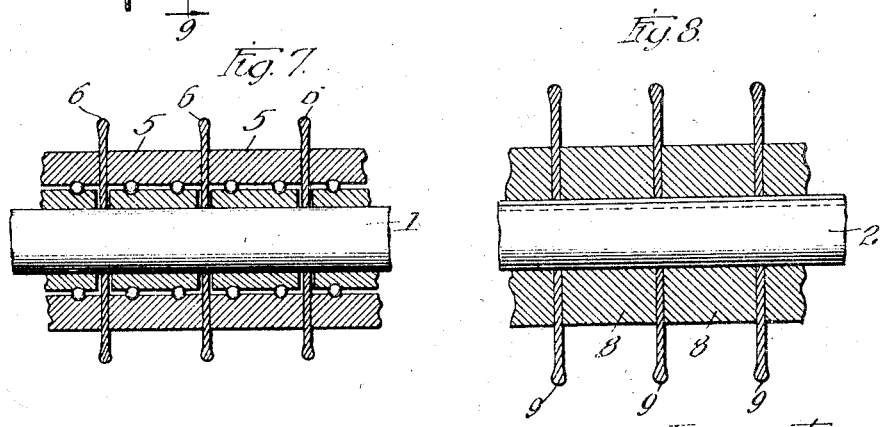

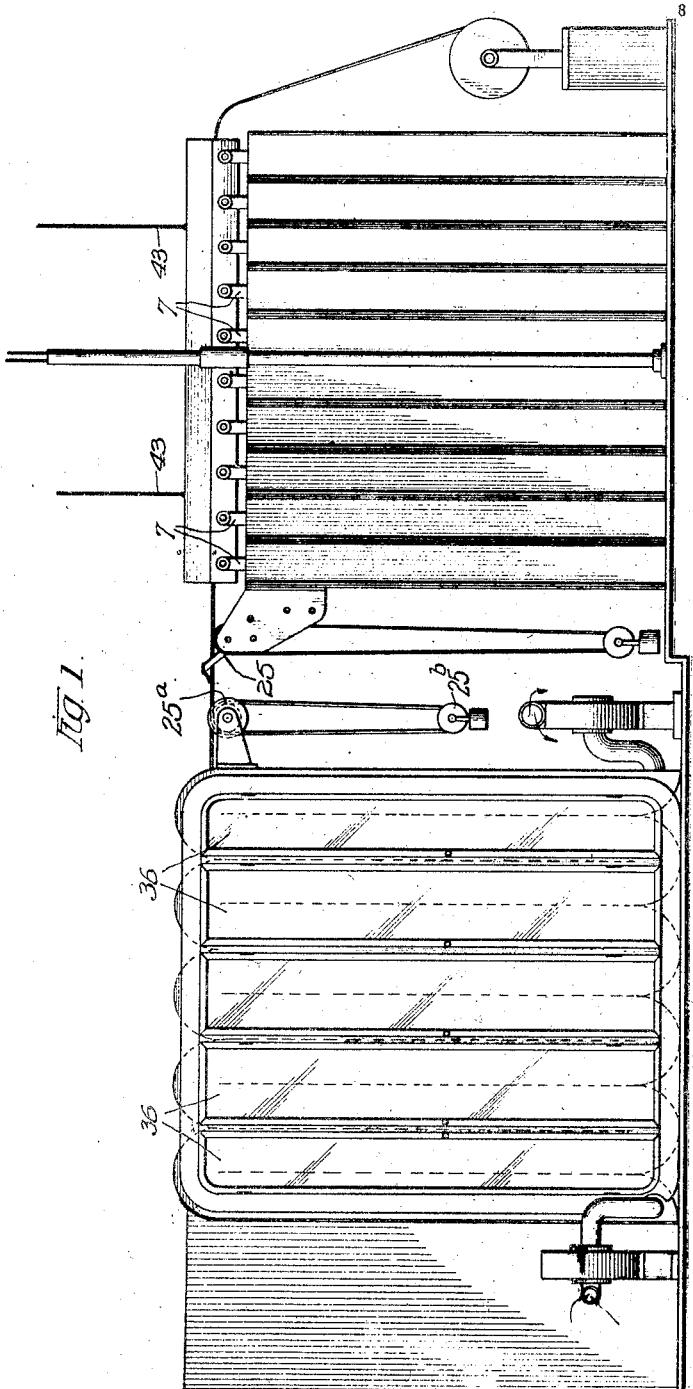

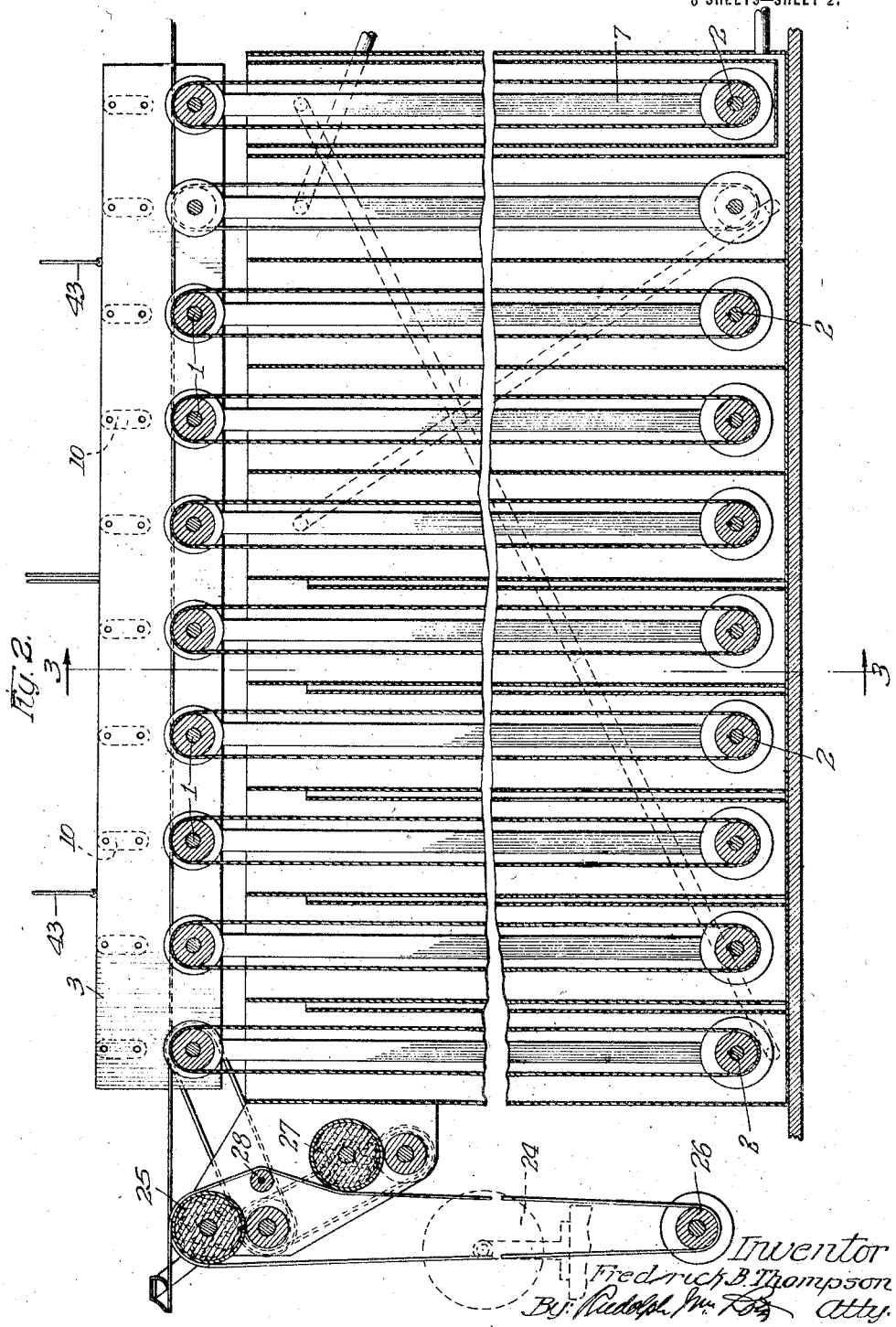

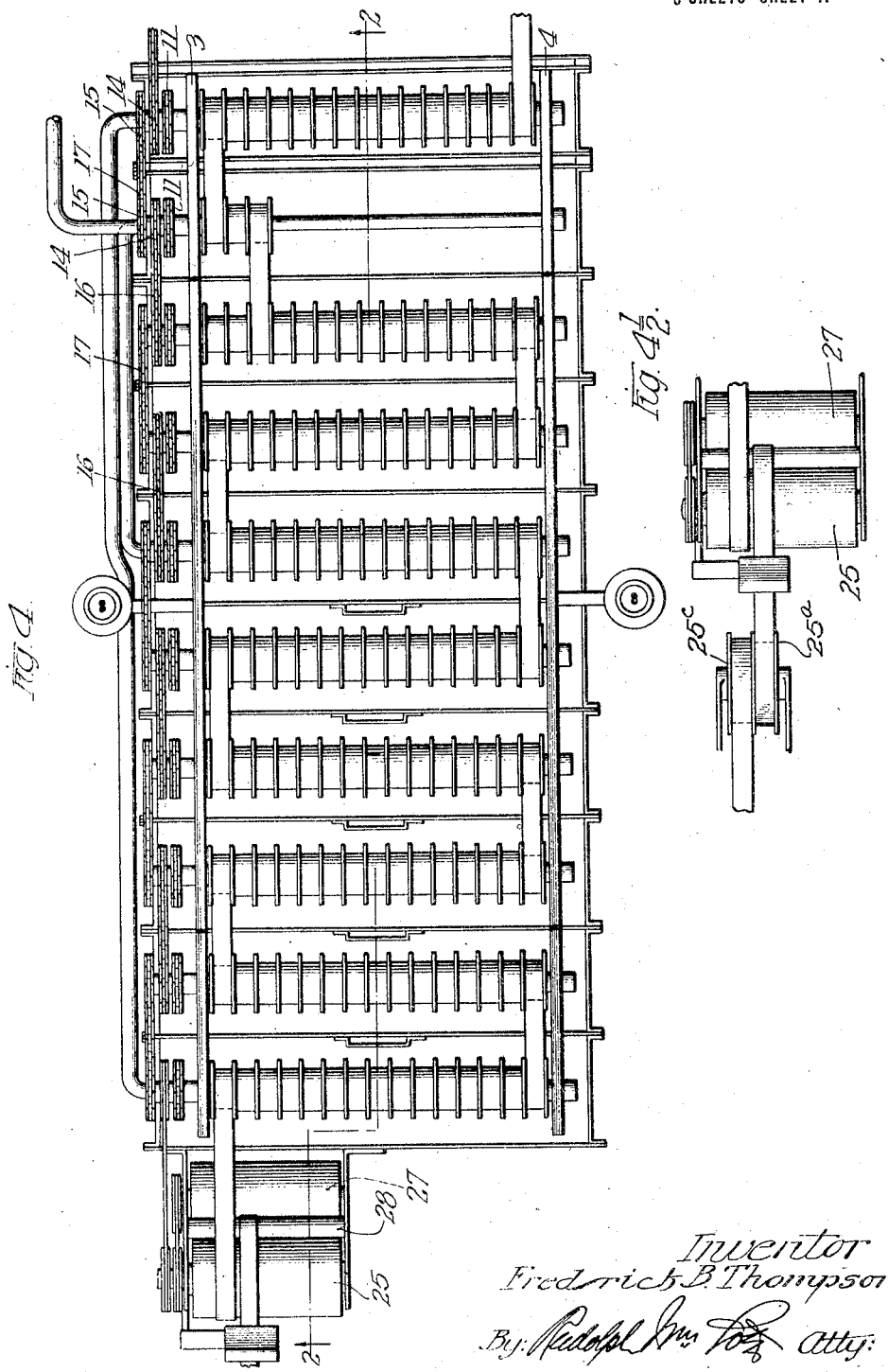

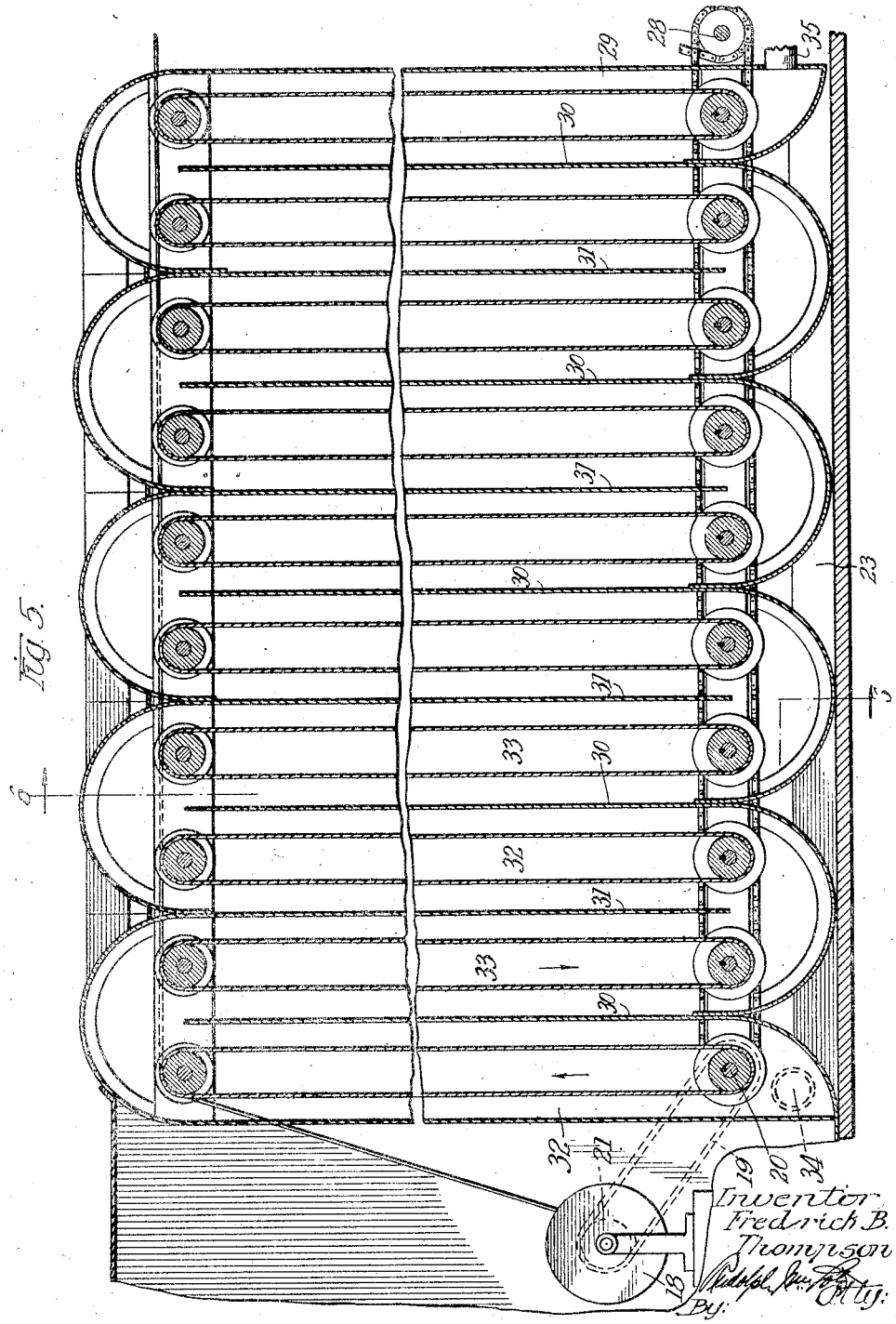

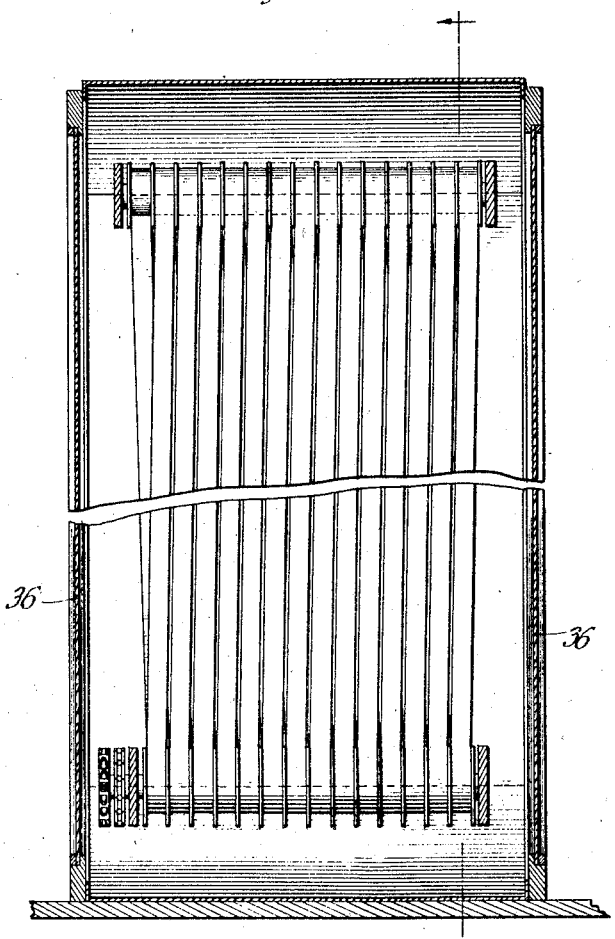
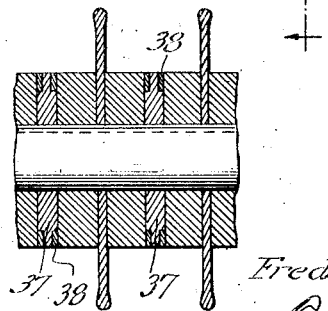

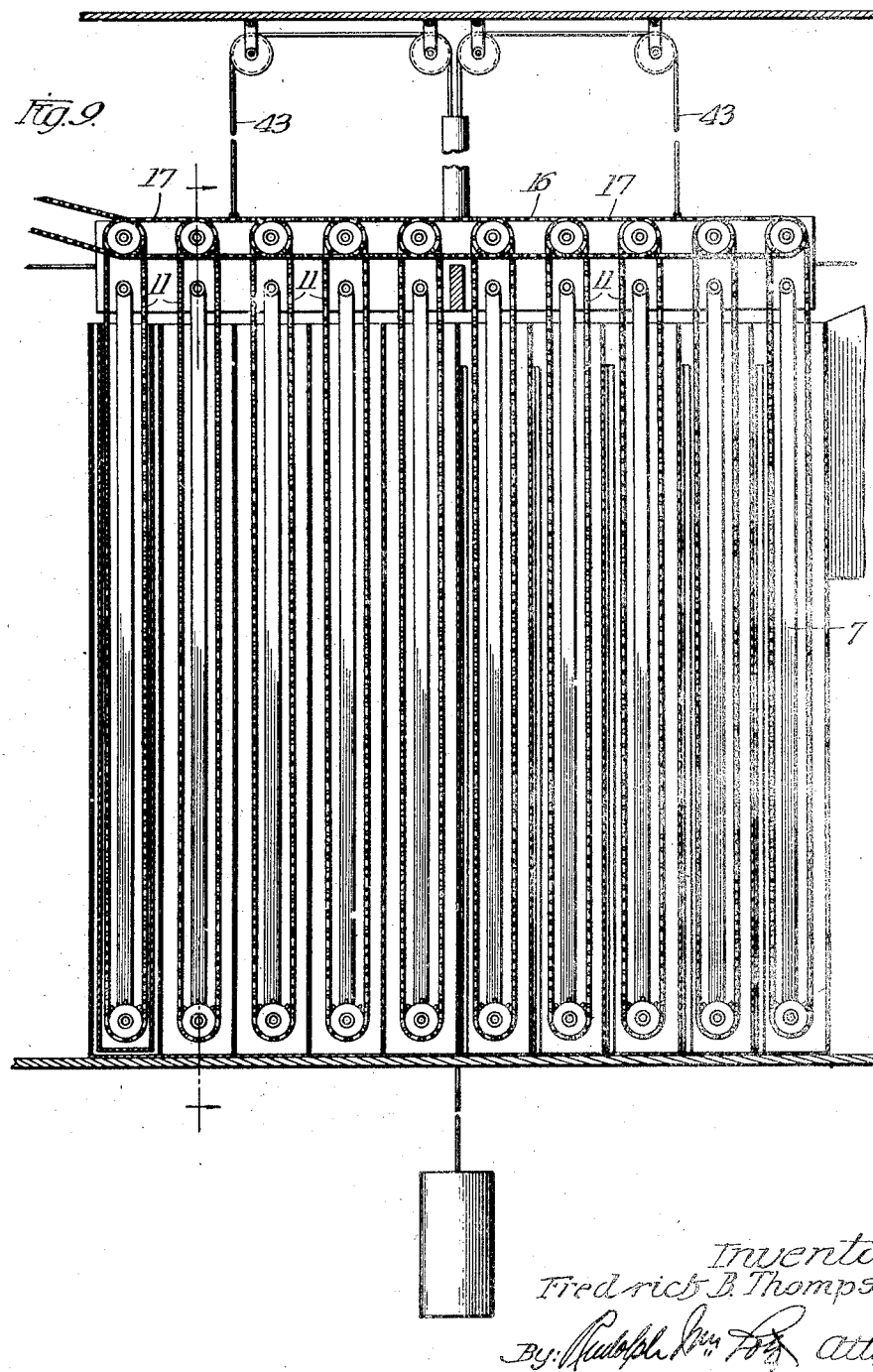

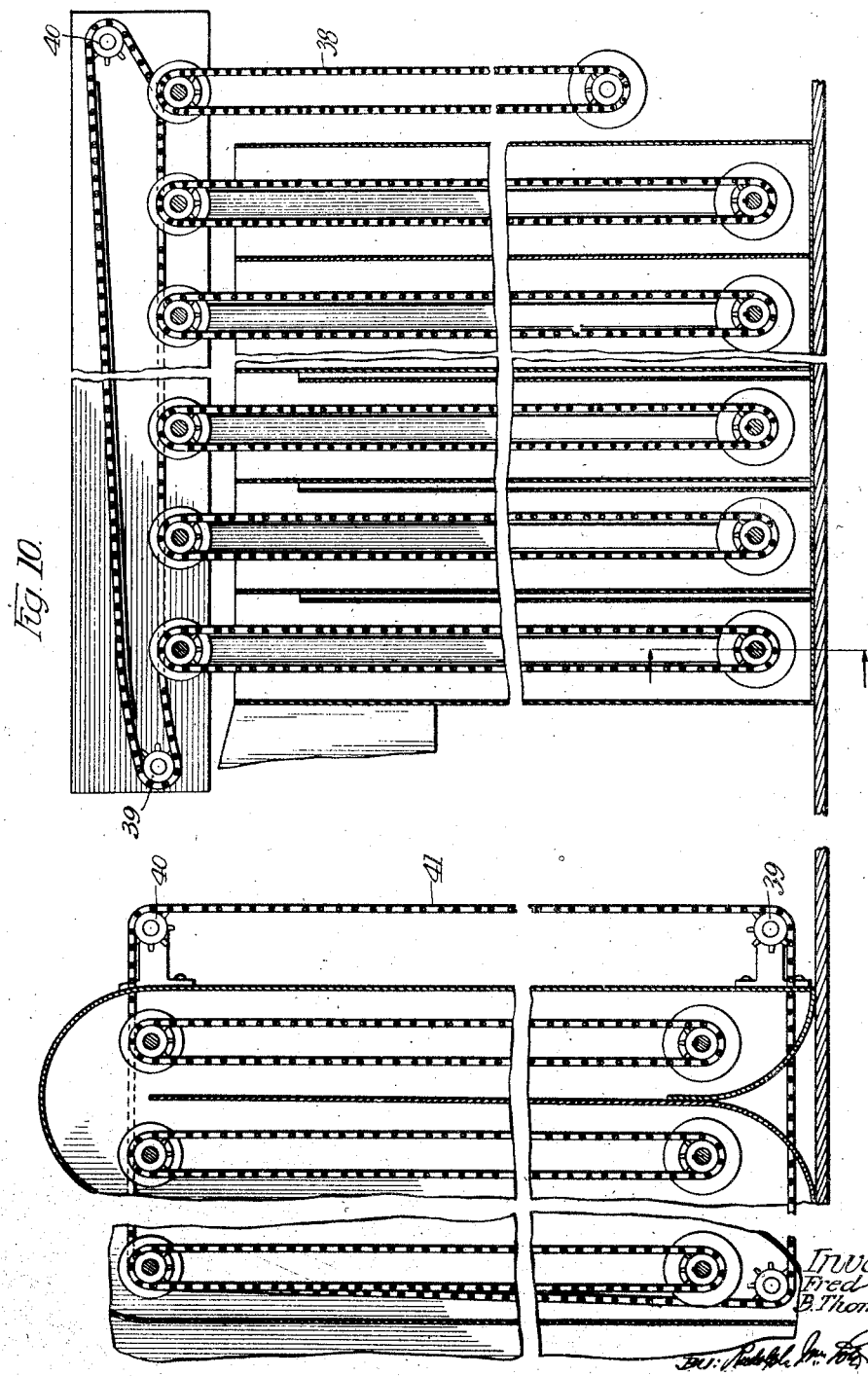

UNITED STATES PATENT OFFICE.

FREDRICK B. THOMPSON, OF CHICAGO, ILLINOIS.

PHOTOGRAPHIC-FILM-TREATING APPARATUS.

1,281,711.  Specification of Letters Patent.  Patented Oct. 15, 1918.

Application filed September 15, 1915, Serial No. 50,866. Renewed April 8, 1918. Serial No. 227,371.

*To all whom it may concern:*

Be it known that I, FREDRICK B. THOMPSON, citizen of the United States, residing at Chicago, in the county of Cook and State of Illinois, have invented certain new and useful Improvements in Photographic-Film-Treating Apparatus; and I do hereby declare the following to be a full, clear, and exact description of the invention, such as will enable others skilled in the art to which it appertains to make and use the same.

This invention has for its object to provide an improved apparatus for treating photographic film tape of that kind which is employed for taking and projecting motion pictures.

The present invention has for its particular object to provide an apparatus of this character in which the film tape is automatically threaded through the apparatus, and over the drive mechanism therefor, and is directly driven by the latter by frictional contact therewith.

A further object of the invention is to provide a drive mechanism for imparting motion to film tape which is relatively so arranged as to be dependent upon tension imparted to the film tape for producing a sufficiently strong frictional contact between the same and said drive mechanism to cause said film tape to be driven; said means including also means whereby upon the release of the tension on the film tape from any cause whatsoever, such for example, as the breaking of said tape at any point, either all or such portion of the tape as is relieved of such tension will immediately cease its motion, thus warning the operator of the break therein and permitting an immediate splicing of the broken parts preparatory to continuing the movement of said tape.

A further important object of the invention is to provide a film treating apparatus in which elongation of the film tape due to absorption of liquid in developing, fixing and washing the same, will be automatically compensated for.

A further important object of the invention is to provide means interposed in the travel of the film-tape for automatically taking up a given amount of shrinkage thereof due to the evaporation of the contained moisture.

The invention includes the apparatus associated with the mechanism for imparting movement to the film tape for passing such film tape successively through baths for developing, fixing and washing the same, and through apparatus for drying the same, such as is described and claimed in my copending applications Ser. Nos. 876,030 filed December 8, 1914, and 45,846, filed August 16, 1915, the present arrangement or details of construction of the tanks and drying apparatus being slightly changed; the present construction of drying apparatus constituting a part of the present invention, said drying apparatus having for its particular object to provide means for effecting forced passage of a large volume of air in a general direction opposite to the direction of travel of the film tape in order to effectually dry the latter.

In the accompanying drawings illustrating the invention:

Figure —1— is a view in side elevation of film treating apparatus embodying my invention and comprising containers for liquids for developing, fixing and washing the film, and a drying chamber for the same.

Fig. —2— is a vertical longitudinal section of an apparatus constructed in accordance with the invention taken on the line 2—2 of Fig. —3— comprising the mechanism for imparting motion to film tape for passing the latter through the tanks for liquids therein shown.

Fig. —3— is a vertical transverse section of the same on the line 3—3 of Fig. —2—.

Fig. —4— is a top plan view of the portion of the apparatus shown in Fig. —2—.

Fig. —4½— is a fragmentary detail top plan view of the film wiping rolls and shrinkage take-up mechanism associated with the film drying apparatus.

Fig. —5— is a vertical longitudinal section through the drier employed.

Fig. —6— is a vertical transverse section on the line 6—6 of Fig. —5—.

Figs. —7— and —8— are detail fragmentary central longitudinal sections of one of the idle and one of the driven shafts constituting a part of the mechanism for imparting motion to the film tape.

Fig. —9— is a view similar to Fig. —1— looking in the opposite direction and showing a modified form of construction.

Fig. —10— is a view similar to Figs. —2— and —5— partly broken away and showing the modified form of construction of mechanism for imparting motion to the film tape substantially the same as that shown in Fig. —9—.

Fig. —11— is a fragmentary detail central longitudinal section through one of the drive shafts of the mechanism illustrated in Fig. —10—.

The present mechanism for imparting motion to the film tape includes a plurality of pairs of horizontal shafts, each consisting of a shaft 1 and a shaft 2. Each of the shafts 1 is rigid and is mounted at its ends in frame pieces 3 and 4 respectively, which may also be termed beams, which are suspended or otherwise suitably supported at any desired elevation, and are adapted to be suitably raised and lowered as will be hereinafter more fully described. On each of said shafts 1 there is mounted a plurality of idle rolls 5, shown in detail in Fig. —7—, each of said rolls being disposed to rotate freely between disks 6 also rotatably mounted on said shaft 1 between contiguous rolls 5, said disks constituting substantially the flanges for said rolls. Said rolls 5 are preferably carried by suitable anti-friction bearings such as the ball bearings illustrated in Fig. —7—.

Projecting downwardly from said frame members or beams 3 and 4 are flat rods 7, particularly shown in Figs. —2— and —3—, and in the lower ends of which are bearings for the shafts 2 which are adapted to be driven. Each of said shafts 2 is provided with a series of rolls 8 rigid therewith and separated from each other by means of disks 9, corresponding in shape with the disks 6 mounted on the shafts 1, the rolls 8 being unrotatable on said shafts 2 and being one less in number than the rolls on the companion shafts 1.

Mounted on the frame member or beam 3 in vertical alinement with the several shafts 1 and projecting from the outer face of said beam are stud shafts 10, each of which carries a sprocket wheel 11 over which a sprocket chain 12 is trained, the latter being also trained over the sprocket 13 on a shaft 2. Each of said stud-shafts 10 is further provided with two sprockets 14 and 14 of the same pitch diameter as the sprocket 11, and over said sprockets 14 of contiguous shafts, sprocket chains 16 are trained, while over the sprockets 15 of contiguous stud shafts 10 sprocket chains 17 are trained, whereby all of said sprockets 11, 14 and 15 are driven simultaneously at uniform speed. The stud shafts 10 are rigid and the sets of three sprocket wheels each comprising a wheel 11 and wheels 14 and 15 are rotatably mounted on said stud shafts 10, but non-rotatably coupled with each other. The sprocket 14 of the stud shaft 10 at one end of the beam 3 is geared to a motor or other suitable source of power for driving all of said shafts, as will be obvious.

It will be seen from the foregoing that the shafts 2 and the rods members 7 are separated from each other by free spaces in which the partition walls separating the several compartments or tanks for liquids from each other are adapted to be received.

As shown in the drawings, each of the shafts 1 is provided with fifteen of said idle rolls 5, while each of the shafts 2 is provided with fourteen of the driven rolls 8, this number being, of course, capable of variation as desired. A ribbon of any suitable material is threaded over the several idle rolls on the face of said shafts 1 and its companion shaft 2 by first passing said ribbon over one of the endmost idle rolls 5 on said shaft, then down over the endmost driven roll on the shaft 2, then back over the second idle roll on the shaft 1, then over the second driven roll on the shaft 2 and so on so that said ribbon is trained substantially helically from end to end of said first pair of shafts 1 and 2. After being trained over the last idle roll on said shaft 1 the said ribbon is trained over the idle roll at the same end of the next contiguous shaft 1, then in the opposite direction over the several idle rolls of said second shaft and the driven rolls of its companion shaft 2, so that said ribbon will pass alternately in opposite directions helically over the several pairs of shafts 1 and 2 or the rolls carried thereby and thus practically zigzag through the apparatus from end to end thereof. The ribbon is unrolled from a reel and after being trained over the last idle roll of the last shaft 1 it is engaged at its forward end with mechanism which is driven to rotate at a speed greater than the normal speed of travel imparted to said ribbon, or adapted to be imparted to said ribbon by the aforesaid mechanism, but in such a manner as to permit slippage so that the function of said take-up roll is to maintain the ribbon under tension. The feed reel or the ribbon or film-tape is preferably retarded frictionally so as not to permit the tape or ribbon to be too freely unwound therefrom, as this would be apt to produce a jerky movement of the film tape such as would be likely to tear it.

The said mechanism for imparting tension to the ribbon or film-tape may consist of a take-up reel 18 preferably driven by means of a belt 19 trained over a sheave on one of the driven shafts 20 in the drying apparatus, which I will hereinafter describe, and a sheave 21 on the shaft of the take-up reel 19ª, said belt being adapted to slip and serving to rotate said reel with sufficient force to at all times maintain the ribbon under a sufficient tension to cause the same to frictionally engage the driven rolls of the mechanism to an extent sufficing to cause the latter to drive the same.

It will be apparent from the foregoing that the moment there is any slack in the ribbon the frictional engagement between the same and the driven rolls will cease and thus render the latter incapable of imparting motion thereto, this being due to the fact that each of the driven rolls would then be obliged to push the film tape forward and this would pile up just sufficient slack successively to throw the tape out of engagement or surface contact with the next forward roll. Thus if it is desired to stop travel of the ribbon it is necessary only, to retard the take-up reel 22 for an instant, whereupon slack would immediately be piled up in the whole length of the film or ribbon sufficient to throw the same out of engagement with the driven rolls.

Primarily a ribbon is used which may consist of an old film tape, or which may also be made of any other suitable material whose only purpose is to permit the photographic film tape to be treated to be connected therewith and thereby threaded upon the mechanism as the said ribbon or original film tape is taken off by a take-up reel. The said photographic film tapes come in lengths approximating one thousand feet each, though, of course, this may be varied at will, and they are successively attached to each other until the total number of said film tapes to be treated has been exhausted and then, previous to stopping the apparatus, the said ribbon originally used is attached to the rear end of the last film tape and by the latter again threaded through the apparatus.

This being accomplished the mechanism is stopped and the last film tape detached from the ribbon. Upon resuming operations after any desired interval the film tape is again attached to the ribbon and thereby threaded through the mechanism as the ribbon is delivered therefrom. It will be noted that the ribbon and film tape are driven entirely by the rollers rigid with the lower shafts 2 and that all of the idle rolls 5 on the shaft 1 are rotatable independently of each other. This in the event that the take-up mechanism should cease to operate to impart tension to the film the latter would immediately pile up slack which would begin at the last driven roll over which the film tape or ribbon is trained and, of course, be communicated almost instantly back to the first of said rolls. This slack which is relatively very slight will by the force of gravity cause the ribbon or film tape to drop out of surface contact with the driven rolls and thus immediately cease to move. The idle rolls will, of course, cease rotation the moment the driven rolls cease to impart motion to the ribbon or tape. Upon again bringing the delivery end portion of the ribbon or tape under tension by again actuating the take-up mechanism the slack will be first taken up over the last of the feed rolls and will, as soon as the said feed roll or the next contiguous feed rolls take hold of the film tape with sufficient force, work back to the feed end of the apparatus just as quickly as the slack had theretofore piled up to throw the ribbon or tape out of engagement with the driven rolls.

The degree of tension to maintain the film tape in motion is relatively slight so that no part of the same will be subjected to undue tension, but in the event of accidental tension of a degree sufficient to break the tape only that portion of the latter which is integral with the delivered end portion still under tension will continue its travel, the other end portion severed therefrom immediately coming to a stop. This will obviously be quickly noticed by the operator who can then, by any suitable means provided for the purpose, cause the take-up mechanism to cease rotating and thus stop the still traveling portion of the film tape, and can then very readily, by taking hold of the severed end of the feed end portion, cause the same to be fed forward to catch up with the delivered end portion, and may then splice this portion together. This is very quickly and easily accomplished and the apparatus may then again be easily set in motion.

It is, of course, necessary that the film tape shall be dry before being rolled up on the take-up reel and, therefore, after the film tape has been fed through the various solutions for developing, fixing and washing the same, it is passed through mechanism for removing surface moisture therefrom and then threaded over a drive-mechanism mounted in a drying chamber 23, which I will hereinafter more fully describe.

At the delivery end of the developing and fixing apparatus for the film, is the mechanism or apparatus for removing surplus moisture from the film tape, this being fully described and claimed in my copending application Ser. No. 105,986, filed June 26, 1916. The film tape after being threaded through the apparatus by the ribbon above described, which may be wound up upon a take-up reel 24 shown in dotted lines in Fig. —2— is detached from the end of said ribbon and then passed over rolls 25, 26, 27 and 28, and again over said roll 25, the surfaces of the rolls 25 and 27 being covered with a moisture absorbing material such as chamois skin or buckskin, as fully described in my aforesaid last-named copending application. These rolls which are preferably driven at the same surface speed as or very slightly greater speed than the film tape will serve to maintain the latter under the necessary tension to maintain it in engagement with the driven rolls of the shaft 2. After being passed over said several rolls last-named, the end of the film tape is attached to a ribbon threaded through the drive mechanism contained in said drying chamber 23, which is identical in structure with the aforesaid mechanism for passing the film tape through the solutions with the single exception that the shafts 2 are driven directly from each other and from a motor driven shaft 28, as will be obvious without additional detailed description.

The roll 26 is an idle roll suspended in a loop of the film-tape and carrying a suspended weight whereby it maintains the film tape normally under a given tension, co-acting in this respect with the several rolls 25, 27 and 28.

After passing a second time over the roller 25 the film tape is trained successively over idle rolls 25$^a$, 25$^b$ and 25$^c$, said roll 25$^b$ being similar to the roll 26 and performing the function of maintaining the film under slight tension with respect to the driving mechanism in the drier and also performing the function of taking up shrinkage in the film due to drying thereof.

As the film tape enters and passes through the several solutions, it takes up moisture and expands, thus elongating. This elongation works back to point of entry of the film tape into the developing solution and does not affect the tension imparted to the film by the rollers 25, 26, 27 and 28, so that the roller 26 will remain practically stationary. The elongated film enters the drier and as moisture is evaporated therefrom it shrinks. But as the rate at which the film is wound upon the take-up reel is constant, the shrinkage must be taken up between the roll 25 and said take-up reel. The roll 25$^b$ permits a certain amount of shrinkage to be taken up automatically and as this is taken up, the said roll 25$^b$ will be gradually elevated and must at intervals, be lowered. This is effected by stopping the take-up reel so that the travel of the film tape in the drier is stopped during an interval sufficient to cause the requisite length of film to compensate for the shrinkage to be fed forward from the roll 25 to lower the roll 25$^b$ to the desired elevation. The take-up reel for the dry film tape is then again set in motion.

This constitutes an important feature of the invention.

It will also be noted that, throughout its travel, only one face of the film tape contacts with the driving elements, this being the unsensitized face, so that injury to the sensitized face is entirely obviated.

Each pair of shafts 1 and 2 of the mechanism contained in said drier 23 is disposed in a compartment or duct of the drier, the latter being a continuous zigzag duct through which air is passed continuously in a direction opposite the general direction of travel of the film tape through said apparatus. This duct 29 is formed of sheet metal and is divided vertically by partitions 30 and 31, respectively, alternated with each other to form a plurality of parallel vertical flues 32 and 33 respectively. Air is admitted to the vertical flue 32, from which the film tape is delivered to the take-up reel 22, through a pipe 34 and passes upwardly therethrough, thence downwardly through the next contiguous vertical flue 33, then upwardly through the next succeeding flue 32 and so on to the last of said vertical flues from which the air is exhausted through an opening or openings 35. The said duct is closed, or substantially closed, at its side portions by means of glass doors 36 which may be readily opened whenever desired to gain access to the several vertical flues 32 and 33 for the purpose of splicing the film if broken, and for observing the general condition of the film in order to ascertain that the same will be completely dried before being wound up on the take-up reel 22. Forced passage of the air is preferably accomplished by means of a blower delivering through the pipe 34, and by means of a suction fan communicating with the opening 35, this being an obvious and well-known expedient requiring no exercise of invention, and being, therefore, omitted from illustration as constituting no specific part of the present invention. Openings are, of course, provided where necessary through the partition walls separating the vertical portions 32 and 33 from each other for the passage of the horizontal portions of the film tape from one shaft to the next contiguous shaft 1 and for the passage of the film-tape to the take-up reel 22.

It will also be noted that the edge portions of the several disks 6 separating the idle rolls 5 from each other and also separating the driven rolls 8 from each other, are provided at their edges with annular heads or enlargements which are adapted to maintain the side edges of the film tape out of contact with the plane surfaces of said disks and thus prevent the edges of the film tape from becoming curled or folded over during travel.

In Figs. —9—, —10— and —11— I have illustrated a modified embodiment of the invention in which the several driven and idle rolls are provided midway between their side edges with sunken sprockets 37 over which a small sprocket chain 38 is trained. This said chain is adapted to have its outermost surface, to which an end of the film tape may be attached, travel at substantially, but preferably very slightly less speed, than the surfaces of the rolls contacting with the film, so that said chain can at no time bring the film tape under sufficiently high tension to effect breakage thereof, that is to say, this chain 38 will serve to thread the tape over the rolls, all of which are obviously driven at the same speed, but will bring it under such tension only at very frequent intervals, this being due to the fact that inasmuch as the rolls are adapted to drive the film tape at a greater speed than the speed of travel of the sprocket chain, said rolls will pile up slack in the chain almost instantly following the take-up of the slack therein by the connection of the chain with the film tape. In this construction the sprocket chain 38 is also trained over idle rolls 39 and 40 by means of which it is returned from the last sprocket over which it is trained back to the first sprocket. As soon as the film tape has been threaded on all of the rolls except the rolls 39 and 40, it is detached from said chain and attached to the sprocket chain 41 by means of which it is threaded through the drier and, after having been threaded over the last roll in the drier, it is detached from said sprocket chain 41 and attached to the take-up reel or other take-up mechanism. In this apparatus the film wiping apparatus or mechanism described and claimed in my last-named copending application may also be employed.

That mechanism which effects passage of the film tape through the developing, fixing and washing apparatus, projects into a plurality of tanks or containers for solutions which are arranged and connected with each other in substantially the same manner as are the tanks described and claimed in my copending application Ser. No. 876030 filed December 8, 1914, particular description of said tanks and connections being omitted from illustration as superfluous.

The beams 3 and 4 by which the several shafts 1 and 2 are supported are adapted to be raised and lowered out of and into the several tanks, and to this end they are suspended by means of cables 43, or other suitable means, from the ceiling of the room or a suitable frame-work which may be equipped with mechanism for elevating and lowering said beams and parts connected therewith, such mechanism being of any suitable construction adapted to the purpose, and special illustration and description thereof being omitted.

My said invention is very simple and efficient and will be readily understood from the foregoing description. Obviously the specific construction illustrated and described is capable of variation without departing from the invention as defined in the appended claims.

I claim as my invention:

1. Film treating apparatus including mechanism for imparting motion to the film tape, comprising alternate driven and idle rotatable members over which the film tape is trained, and a driven take-up element adapted to impart tension to the film tape to maintain the same in frictional engagement with said driven members for causing the latter to impart motion thereto.

2. Film treating apparatus including mechanism for imparting motion to the film tape, comprising alternate driven and idle rotatable members over which the film tape is trained, and means engaged with the delivery end portion of the tape and adapted to move the same at greater speed than it is adapted to be moved by the driven element whereby to maintain the tape under tension and in frictional engagement with said driven members for causing the latter to impart motion thereto.

3. Film treating apparatus including mechanism for imparting motion to the film tape, comprising alternate driven and idle rotatable members over which the film tape is trained, and frictionally driven means engaged with the delivery end portion of the tape and adapted to be moved by the driven element whereby to maintain the tape under tension and in frictional engagement with said driven member for causing the latter to impart motion thereto.

4. Film treating apparatus including mechanism for imparting motion to the film tape, comprising a plurality of pairs of shafts each carrying a plurality of rolls over which the film tape is adapted to be trained, the rolls of one of said shafts being driven and the rolls of the other thereof being idle and rotatable independently of each other, and take-up mechanism associated with said rolls adapted to draw the tape yieldingly at higher speed than the speed at which it is driven by said driven rolls for maintaining the same under tension and in engagement with said driven rolls to be actuated thereby.

5. Film treating apparatus including mechanism for imparting motion to the film tape, comprising a plurality of pairs of shafts each carrying a plurality of rolls over which the film tape is adapted to be trained, the rolls of one of said shafts being driven and the rolls of the other thereof being idle and rotatable independently of each other, and take-up mechanism associated with said rolls adapted to draw the tape yieldingly at higher speed than the speed at which it is driven by said driven rolls for maintaining the same under tension and in engagement with said driven rolls to be actuated thereby, said driven rolls being disposed below said idle rolls.

6. Film treating apparatus including mechanism for imparting motion to the film tape, comprising alternate driven and idle rotatable members over which the film tape is trained, and a driven take-up element adapted to impart tension to the film tape to maintain the same in frictional engagement with said driven members for causing the latter to impart motion thereto, said driven rotatable members disposed below the idle rotatable members.

7. Film treating apparatus including mechanism for imparting motion to the film tape, comprising alternate driven and idle rotatable members over which the film tape is trained, and means engaged with the delivery end portion of the tape and adapted to move the same at greater speed than it is adapted to be moved by the driven element whereby to maintain the tape under tension and in frictional engagement with said driven members for causing the latter to impart motion thereto said driven rotatable members disposed below the idle rotatable members.

8. Film treating apparatus including mechanism for imparting motion to the film tape, comprising alternate driven and idle rotatable members over which the film tape is trained, and frictionally driven means engaged with the delivery end portion of the tape and adapted to move the same at greater speed than it is adapted to be moved by the driven element whereby to maintain the tape under tension and in frictional engagement with said driven members for causing the latter to impart motion thereto, said driven rotatable members disposed below the idle rotatable members.

9. In a film treating apparatus, mechanism for effecting travel of a film tape comprising rotatable members adapted to be continuously driven, idle rotatable members associated therewith, and take-up mechanism, the film tape being trained alternately over said driven and idle members and engaged at one end portion with said take-up mechanism, the latter being yieldingly driven to impart motion to said film-tape at higher speed than that imparted thereto by said driven members whereby to maintain said tape under tension and frictionally engaged with said driven members for causing the latter to impart motion thereto, said driven and idle rotatable means relatively arranged to cause slack in said film tape to throw the same out of engaging relation to the driven members.

10. In a film treating apparatus, mechanism for effecting travel of a film tape comprising rotatable members over which the film tape is adapted to be trained, some of said members being driven and the remainder thereof being idle, and means associated therewith and engaged with the film-tape for imparting tension thereto to maintain the same frictionally engaged with said rotatable members to be actuated by the said driven members.

11. A film treating apparatus comprising mechanism frictionally engaging the film tape for imparting travel thereto, and means disposed at the delivery end of the said mechanism and engaged with the film-tape for imparting tension thereto for throwing the same into driving engagement with said mechanism the latter automatically permitting slippage of the film-tape relatively thereto for compensating for elongation or contraction of the film tape.

In testimony whereof I have signed my name in presence of two subscribing witnesses.

FREDRICK B. THOMPSON.

Witnesses:
  M. M. BOYLE,
  C. M. CONLIN.